(12) United States Patent
Cronin et al.

(10) Patent No.: US 7,092,702 B2
(45) Date of Patent: Aug. 15, 2006

(54) DOWNLOAD OF USER INTERFACE ELEMENTS INTO A MOBILE PHONE

(75) Inventors: Michael Cronin, Munich (DE); Niels Drejer, Baden Württemberg (DE); Michael John Lawrie, Munich (DE); Pierluigi Pugliese, Vaterstetten (DE); Juergen Rauch, Buchloe (DE)

(73) Assignee: Agere Systems Inc., Allentown, PA (US)

( * ) Notice: Subject to any disclaimer, the term of this patent is extended or adjusted under 35 U.S.C. 154(b) by 434 days.

(21) Appl. No.: 10/071,673

(22) Filed: Feb. 7, 2002

(65) Prior Publication Data

US 2002/0137502 A1    Sep. 26, 2002

(30) Foreign Application Priority Data

Mar. 20, 2001   (DE)   .......................... 201 04 839 U

(51) Int. Cl.
*H04M 3/00*    (2006.01)
*H04Q 7/20*    (2006.01)

(52) U.S. Cl. ...................... 455/418; 455/419; 455/420; 455/425; 455/423

(58) Field of Classification Search ........ 455/418–420, 455/414.1, 566, 550.1, 425, 423
See application file for complete search history.

(56) References Cited

U.S. PATENT DOCUMENTS

| 5,086,513 | A | * | 2/1992 | Lawrence et al. | ....... 455/186.1 |
|---|---|---|---|---|---|
| 5,315,638 | A | * | 5/1994 | Mukari | ........................ 455/418 |
| 5,410,326 | A | * | 4/1995 | Goldstein | .................... 348/734 |
| 5,689,825 | A | * | 11/1997 | Averbuch et al. | ........... 455/418 |
| 5,815,142 | A | * | 9/1998 | Allard et al. | ................ 345/173 |
| 5,887,254 | A | * | 3/1999 | Halonen | ..................... 455/419 |
| 5,940,483 | A | * | 8/1999 | Shaffer et al. | .............. 379/130 |
| 6,018,654 | A | * | 1/2000 | Valentine et al. | ......... 455/414.4 |
| 6,138,009 | A | * | 10/2000 | Birgerson | ................... 455/419 |
| 6,301,626 | B1 | * | 10/2001 | Knox | .......................... 710/10 |
| 6,356,543 | B1 | * | 3/2002 | Hall et al. | ................... 370/352 |
| 6,393,274 | B1 | * | 5/2002 | Peltonen | .................. 455/414.1 |
| 2001/0012281 | A1 | * | 8/2001 | Hall et al. | ................... 370/338 |
| 2001/0041568 | A1 | * | 11/2001 | Hughes et al. | .............. 455/434 |
| 2001/0046862 | A1 | * | 11/2001 | Coppinger et al. | ......... 455/435 |

FOREIGN PATENT DOCUMENTS

KR    2001001526 A   *   1/2001

* cited by examiner

*Primary Examiner*—George Eng
*Assistant Examiner*—Wesley Kim

(57) ABSTRACT

A mobile communication system for general data transmission and a mobile phone employable in the mobile communication system. In one embodiment, the mobile phone includes a receiver and a transmitter for receiving and transmitting radio frequency signals, a digital memory for storing digital data and a digital processor for processing the digital data. The digital memory stores downloaded data with executable software that is downloaded from an external data source. The downloaded data may include menu descriptions, sounds and animations for the mobile phone.

22 Claims, 3 Drawing Sheets

DOWNLOAD OF USER INTERFACE ELEMENTS INTO A MOBILE PHONE

CROSS-REFERENCE TO FOREIGN APPLICATION

This application claims the benefit of EPC Application No. 201 04 839.6 entitled "Download of User Interface Elements Into a Mobile Phone" to Cronin, et al., filed on Mar. 20, 2001, which is incorporated herein by reference.

TECHNICAL FIELD OF THE INVENTION

The present invention is directed, in general, to data transmission and, more specifically, to transmitting data over a mobile communication system to upgrade the functionality of a mobile phone.

BACKGROUND OF THE INVENTION

Communication systems are intended to serve the needs of a variety of users. Mobile communication systems, in particular, are of increasing interest for speech communication as well as for data transmission applications. In fact, the applicability of mobile communication systems seems to be constantly changing. For example, hardware and software for mobile communication systems often have a reduced life due to the competition of different service providers who offer improved functionality and a greater variety of services.

Presently, it is often necessary to buy new hardware for mobile communication in order to use a new service or a new functionality of an already established service. Moreover, a retailer may endure losses as a result of a severe price reduction due to the inability to sell mobile communication products within a certain period of time. Selling of these products becomes increasingly more difficult even shortly after the products are no longer on the edge of recent developments.

Accordingly, what is needed in the art is a system for upgrading or updating the functionality of existing communication devices to avoid any unduly reduced life cycle of such communication devices.

SUMMARY OF THE INVENTION

To address the above-discussed deficiencies of the prior art, the present invention provides a communications device such as a mobile phone that includes a receiver and a transmitter for receiving and transmitting radio frequency signals, a digital memory for storing digital data wherein the digital memory includes downloaded data with executable software from an external data source, and a digital processor for processing the digital data. The downloaded data may update or upgrade the functionality of the mobile phone on the basis of the executable software.

If the external data source is a base transceiving station of a mobile communication system, then a modular system of different run-time modules may be available on-demand to increase a number of available functions of a mobile phone. In other words, a connection between the mobile phone and the base transceiving station may be established to allow the download of data to increase the functionality of the mobile phone. The downloaded data may remarkably reduce the need for expensive components and also reduce any undue complexities of the mobile phone. Such reductions are of increasing interest in view of future Internet functionality, especially when considering Wireless Application Protocol (WAP) communication channels.

The mobile phone may have electronic circuitry that provides an interface with external digital devices for data exchange with a local database or a database system. The interface with the external digital devices is preferably adapted to exchange data with a personal computer, a database system at the location of a manufacturer or a re-seller, or a database of an Internet data service provider.

A very convenient and ergonomic way to display additional functionality for the mobile phone includes a keyboard with at least a section wherein a layout is defined by the downloaded data. In one embodiment, the mobile phone has an Liquid Crystal Display (LCD) keyboard having associated keys with LCD-fields or a headline associated with and located in the vicinity of the associated keys of the keyboard.

Alternatively or in addition to the associated keys of the LCD-keyboard, the mobile phone may include a main display having at least a section where dialogues or menus are displayed. In an alternative embodiment, the dialogues and menus are provided by or based on the downloaded data.

The mobile phone may establish a very efficient interface when the main display includes icons having an associated functionality on a touch-screen area. Based on visual contents of the displayed icons, a high degree of intuitive user guidance may be provided. The icons and the associated functionality are provided by the downloaded data.

Additionally, an acoustic interface may also be defined in another alternative embodiment. In this embodiment, a loudspeaker of the mobile phone is coupled to electronic circuitry for driving the loudspeaker. The mobile phone may then utilize the downloaded data to play melodies, to output audio messages or acoustic signals associated with defined functions of the mobile phone.

In another aspect, the present invention provides a mobile communication system and a system for configuring a mobile phone. The mobile system includes an external data source for providing downloaded data to a mobile phone as described herein. The system for configuring a mobile phone includes a computer that includes a database with data that is downloadable by a mobile phone as described herein.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

In the course of the detailed description several terms will herein be used to describe embodiments of the present invention. Representative definitions of the terms given below are not intended to restrict the scope of the inventive teaching but rather to clarify a content of the disclosure of the description and the appended claims.

"Executable software" which in brief is also termed "executable" according to the description of the invention is software that includes executable programs and software that configures, activates or deactivates devices or functional elements. The functional elements may be hardware components where the virtual hardware functionality is provided by software that especially defines or realizes virtual machines. Additionally, the software may provide machine functionality, especially software that provides functions of a communications device (e.g., a mobile phone) or adapts the mobile phone functionality to a service or functionality provided by a base transceiving station, for instance.

"Digital," in the sense of the invention, is not restricted to binary or two state systems but includes all numeric processing systems. For example, digital includes systems having a numeric basis of three or more.

"Run-time software," in the context of the description, contains all the functionality necessary to operate the mobile phone. In certain embodiments, however, the run-time software does not include resources and therefore no look and feel are defined.

A "downloadable resource" is any resource or software that can be complied via a resource compiler in the mobile phone and downloaded into the phone, especially to complete the functionality described by the software with information that defines the actual look and feel of the mobile phone. A downloadable resource might also contain executable software.

A "downloaded resource" is typically a downloadable resource that has been downloaded into the mobile phone. A "resource loader" is a program, preferably a PC program, that downloads a resource into the mobile phone. A "resource compiler" is typically a personal computer (PC)-based program that allows the downloadable resource to be compiled and downloaded via the resource loader.

Figure 1:
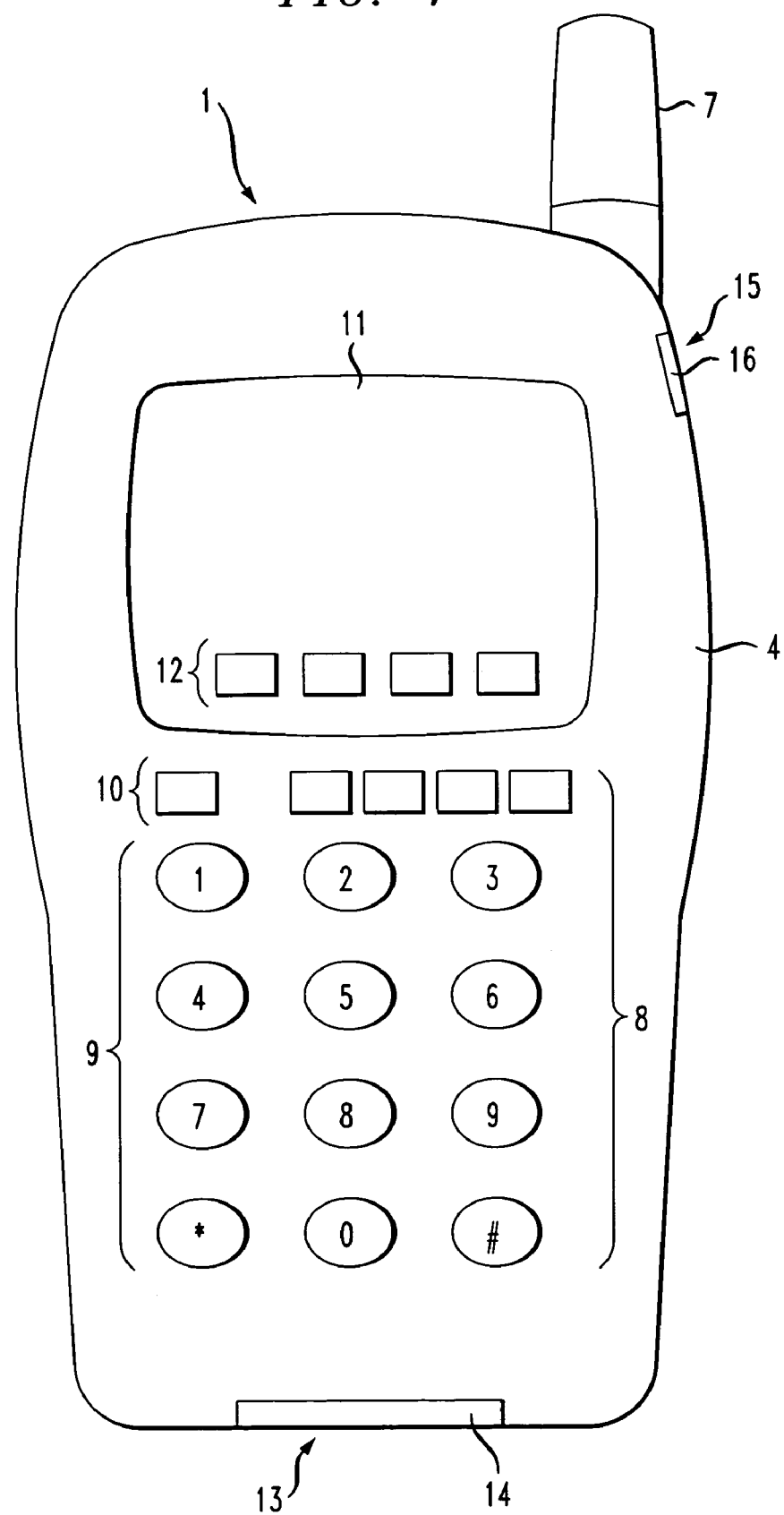
FIG. 1 illustrates a front view of an embodiment of a mobile phone in accordance with the principles of the present invention.
Figure 2:
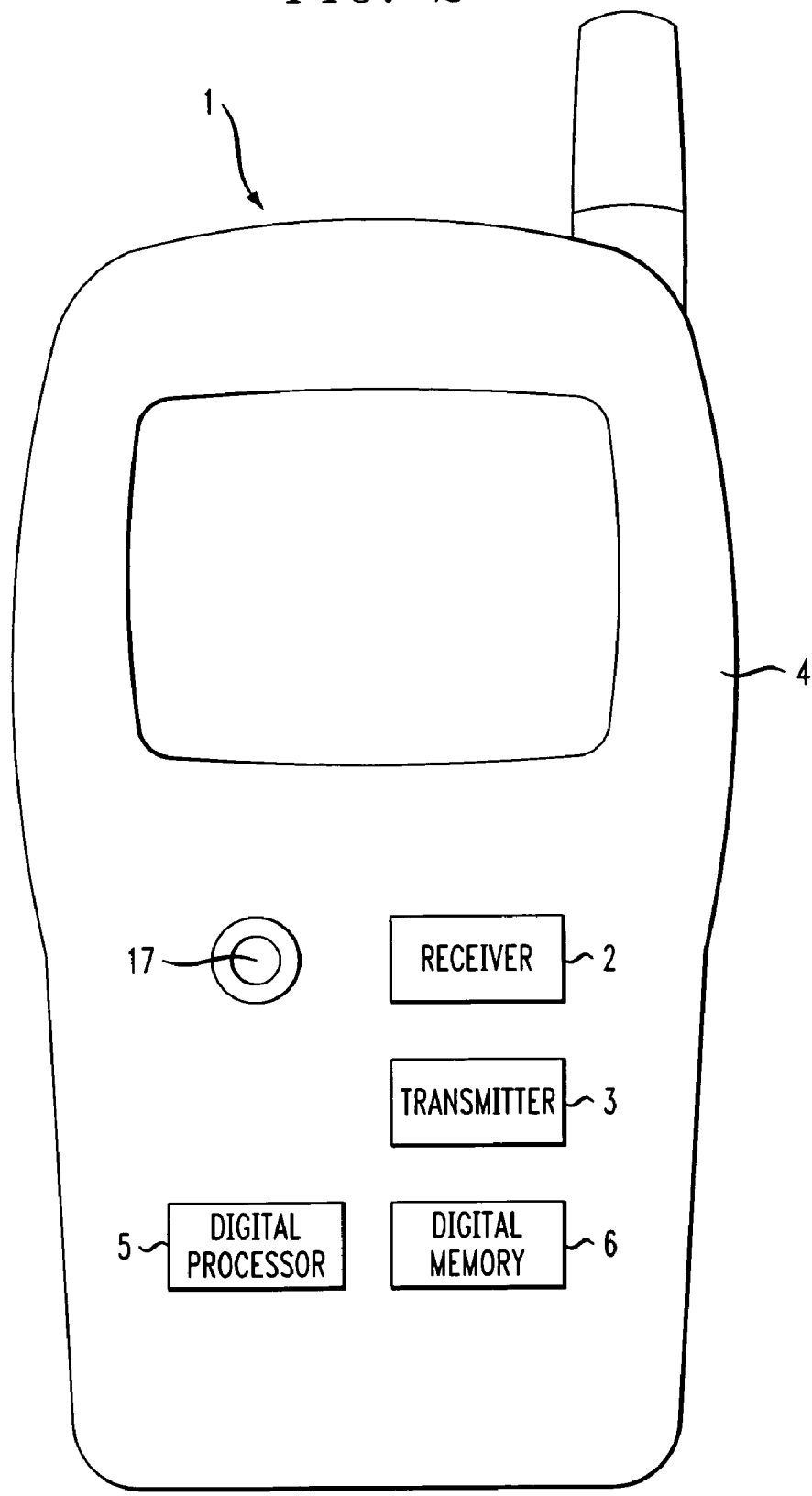
FIG. 2 illustrates internal components of the mobile phone of FIG. 1 in accordance with the principles of the present invention.

Reference is now made to FIG. 1 illustrating a front view of an embodiment of a mobile phone 1, and to FIG. 2 detailing internal components thereof. In general, the invention relates to data transmission and communication devices such as the mobile phone 1 having a receiver 2 and a transmitter 3 for receiving and transmitting signals (e.g., radio frequency signals), respectively.

Referring to FIG. 1, the mobile phone 1 includes a housing 4, an antenna 7, a keyboard 8, a main display 11, an interface unit 13 having a receptacle type connector 14, an infrared communications transmitter and receiver 15, and an infrared transmissive window 16. The keyboard 8 includes a section having numeric keys 9 and a section with keys having their own display 10. Additionally, the main display 11 includes a lower section with icons of associated functions 12.

Referring to FIG. 2, as mentioned above, the mobile phone 1 includes the receiver 2 and the transmitter 3. In addition, the mobile phone 1 includes a digital processor 5, a digital memory 6 and a loudspeaker 17. As illustrated, the digital processor 5 and the digital memory 6 are accommodated within the housing 4 of the mobile phone 1.

The digital processor 5 processes digital data and the digital memory 6 stores digital data. As one skilled in the art will understand, the digital processor 5 and the digital memory 6 are connected with associated circuitry for operation of the mobile phone 1. In an advantageous embodiment, the digital memory 6 includes run-time software stored in an electrically erasable programmable read-only memory (EEPROM) for operation of the mobile phone 1.

The digital memory 6 includes downloaded data with executable software from an external data source. The digital memory 6 may include pre-stored run-time software and the downloaded data with executable software adapted for the respective digital processor 5. Additionally, the digital memory 6 may include a respective part of the run-time software that interprets the downloaded data and converts the downloaded data into executable software for the digital processor 5.

In another advantageous embodiment, the external data source may be a base transceiving station of a mobile communication system. In this embodiment, data transfer may take place via an established communication channel with the base transceiving station and the mobile phone 1. The data transfer may be during normal use or during certain time slots. The data transfer may be indicated in the main display 11 of the mobile phone 1.

As illustrated, a loudspeaker 17 is also accommodated within the housing 4 of the mobile phone 4. The loudspeaker 17 is connected to and driven by an electronic circuit. In an advantageous embodiment, the loudspeaker may employ downloaded data that includes melodies, speech messages or acoustic signals associated with functions of the mobile phone 1.

Returning to FIG. 1, at a lower portion of the housing 4 of the mobile phone 1 is the interface unit 13. In general, the interface unit 13 is configured to exchange digital data with an external data source that includes a personal computer, a database system at the location of a manufacturer or a re-seller, or a database of an Internet data service provider. One skilled in the art will understand that the interface unit 13 may be configured to exchange digital data with other external data sources than those mentioned above.

The receptacle type connector 14 of the interface unit 13 is adapted to establish an electrical connection with a mating electrical connector of a serial or parallel communication cable which is not shown in the drawings. The mobile phone 1 may also exchange data via the infrared communication transmitter and receiver 15. As illustrated, the infrared communication transmitter and receiver 15 is located behind the infrared transmissive window 16.

In alternative embodiments, the digital data may be exchanged according to the Fast Infrared Data Association (IrDA FIR) standard and according to the Amplitude Shift Keyed Infrared (ASK-IR) standard if an optical communication link is established. If a data cable is used, for example with a personal computer having serial or parallel communication links, then the digital data may be exchanged according to serial or parallel communication standards. For using Internet services, the mobile phone 1 may also include an Internet interface. The Internet interface may exchange data with Internet service providers according to the Wireless Application Protocol (WAP) standard.

As illustrated in FIG. 1, the antenna 7 protrudes from the housing 4 of the mobile phone 1. In an advantageous embodiment, the mobile phone 1 may receive and transmit radio frequency signals via the antenna 7. In another embodiment that is not illustrated, the antenna 7 may be completely accommodated in the housing 4 and, therefore, not visible from outside.

The keyboard 8 includes the section having numeric keys 9 and the section with keys having their own display 10. In one embodiment, their own display may be a Liquid Crystal Display (LCD) or Light Emitting Diode (LED) display that illustrates abbreviations or shortcut symbols of associated functions which are activated upon depressing a key from the section with keys having their own display 10.

The main display 11 may also be a color LCD, especially a Thin Filed Transistor (TFT) display. The main display 11 also include a touch screen field at least at the location of the lower section with icons of associated functions 12 thereof with the respective icons. Consequently, the main display 11 defines in the lower section with icons of associated functions 12 a part of keyboard 8 wherein a layout of the keys of keyboard 8 are defined by the downloaded data or, in absence thereof, by the run-time software. The mobile phone 1 may also have a display that includes at least a section where dialogues or menus are displayed. As with the layout of the keys, the dialogues and menus may also be provided by the downloaded data. If additional functions or functionality are provided by the downloaded data, then the downloaded data also provides a menu structure that is defined and issued to the main display 11.

The present invention also teaches a system for mobile communication that includes a mobile phone and an external data source. The mobile phone in the mobile communication system may be the mobile phone 1 as specified above. In an advantageous embodiment, the external data source may include a base transceiving station of a cellular mobile communication system. In another embodiment, the mobile communication system may be a Global System for Mobile Communications (GSM) communication system. In other embodiments, the mobile communication system may also be a Universal Mobile Telecommunications System (UMTS) Code Division Multiple Access (CDMA) communication system.

The present invention is also directed to a system for configuring a mobile phone. The system includes a mobile phone and a computer with a database that has data to download to the mobile phone. In an advantageous embodiment, the system is installed at a location of a manufacturer, a wholesaler or a vendor.

Technical Features of the Downloadable Resources

General Features of the Resources

Every type of resource typically has a version number. A resource loader may be a part of a module of a run-time software or of an external data source. The resource loader checks the compatibility between resources and the run-time software and decides to either compile the resource in a particular format or that this cannot be done. If the latter case, the resource loader terminates with an error or a respective indication on the main display 11 of the mobile phone 1 or a display of the external data source.

The run-time software in the mobile phone 1 checks to ascertain if the downloaded resources are version compatible. In an advantageous embodiment, an encryption algorithm is used to prevent other tools from accessing the mobile phone 1. When a data cable is used to download the data, the encryption algorithm is preferably based on the International Mobile Equipment Identity (IMEI) of the mobile phone 1 and the date and time when the resource is downloaded.

The resource is typically downloaded using a layered approach. A program of the external data source has an individual serial number and an associated "level" of programming capability. The program of the external data source is allowed to customize the resources at the associated level or at a lower level at every stage of downloading specified resources. While downloading the specified resources or personalizing the mobile phone 1, the program of the external data source also specifies a new level of these resources. The program of the external data source, however, is typically not allowed to change resources with a lower level number. With this restriction, it is possible to limit the number of modifications that can be introduced after a defined customization phase.

Figure 3:
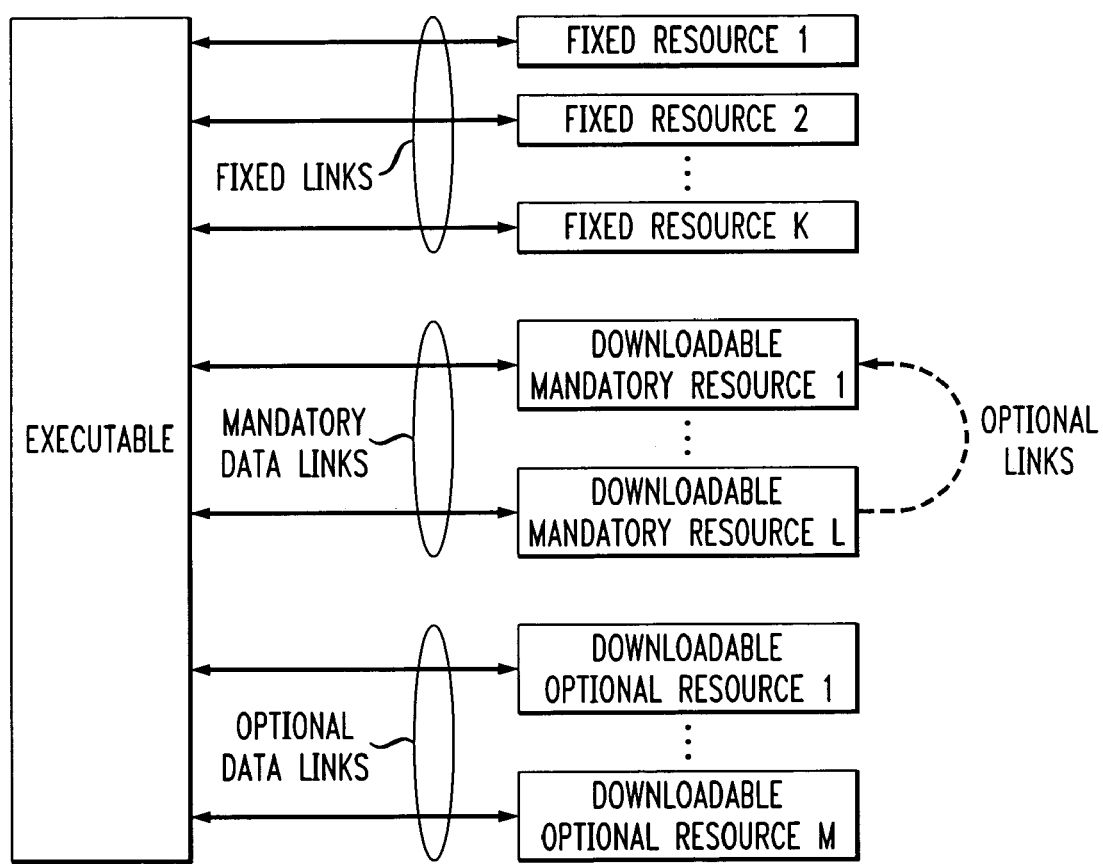
FIG. 3 illustrates a functional relationship between executable software, fixed resources and downloadable mandatory resources in accordance with the principles of the present invention.

Generally, during manufacturing, the mobile phone 1 initially has no additional resources inside except a standard list of resources covering basic functions of a mobile phone such as establishing when a communication link with a local base transceiving station is available. Programming during manufacturing is often at a level 1. At this level of programming, all of the resources may be changed. All of the resources defined as belonging to level 1 typically cannot be subsequently changed at any other level (i.e., cannot be changed by a user). Referring to FIG. 3, the level 1 resources are shown as fixed resources 1 to k.

In the post-manufacturing phase, other programming levels are used. These levels are level 2, level 3 and level 4. When the manufacturer tailors the mobile phone 1 for a specific market, then this is an example of the level 2 programming. An example of the level 3 programs are network operator programs. At the level 4, service providers may program. Programming levels 3 and 4 are shown as mandatory resources 1 and L in FIG. 3. For end users, programming is available at level 5 where optional resources are downloaded on demand. These resources are shown in FIG. 3 as optional resources 1 and M. Menus of the mobile phone 1 are defined by the run-time software and the downloaded data linking fixed resources, mandatory resources and optional resources.

Internationalization

The run-time software publishes a set of T-messages, wherein each T-symbol is associated with a numeric value. A resource compiler creates a downloadable table for a T-symbol numeric value text string with the translation for each language. In the structure of this table, a shortcut can be defined to avoid repetition of the same string, as in messages with no translation or in the case of messages that correspond to the same string in a certain language.

The resource compiler in the external data source generates a table with global information for the run-time software including a number of languages, a textual description of each language to be used in the language selection menu, a language group for each language and a default language, or an indication that the mobile phone 1 should use the defined language of the Subscriber Identity Module (SIM) card if a SIM card is inserted. The resource compiler also detects duplicate translations and avoids multiple copies of the same text. In addition, the resource compiler handles a compression algorithm and issues a warning alerting the operator if a translation is missing. For the missing translation, the resource compiler uses either a default translation which is English or issues an error message like "Missing Translation." This warning is typically always shown at a display of the external data source when the resources are compiled.

If no messages associated with the resources are downloaded, an error message is issued on a display of the external data source preferably in the English language. The same error message is shown upon downloading the specific resource in the main display 11 of the mobile phone 1. The lack of help text does not cause the run-time software to stop.

Sound Samples

The run-time software issues a set of SND messages such as sound messages. Each SND symbol is associated with a numeric value of a specific resource defining a specific sound or tone. The resource compiler in the external data source creates a downloadable table with a SND symbol numeric value such as sampled sound data for each language. A shortcut can be defined to avoid repetition of the same sound as in the case of no translation. The global information used by the resource compiler to generate the downloadable tables are typically the same used for the text internationalization.

The resource compiler converts the sound sample in a format to be played by the mobile phone 1 and issues a warning to inform the operator in case of missing sound samples. The resource compiler uses for the missing sound either a default one which is usually the English one or an error message like "Missing Sound." The warning is always shown when the resources are compiled or, as an alternative, when the compiler stops operating. If a sound is not present, then the run-time software does not play anything.

Animations

The run-time software displays a set of required or optional animations (AN) on the main display 11 of the mobile phone 1. Each AN symbol has a numerical value. The resource compiler in the external data source creates a downloadable table with the AN symbol numeric value and a AN structure that describes the animation. In addition, the resource compiler detects duplicate AN, avoids multiple copies and detects the bitmaps for the AN and compiles these. The resource compiler also issues a warning to the operator if the AN are missing. The resource compiler uses, instead of the missing AN, a default "dummy" one. The warning is shown when the resource are compiled or, alternatively, when the compiler stops operating.

Melodies

The run-time software of the external data source issues a set of M-symbols associated with a specific melody or a specific sound, with each M-symbol associated with a numeric value. The resource compiler creates a downloadable data table with a M-symbol numeric value and a description of the melody. In addition, the resource compiler generates a global information table for the run-time software that includes a number of melodies and a description of each melody in the form of a T-symbol to be used in the melody selection menu.

The resource compiler detects duplicate melodies, avoids multiple copies of the same text and issues a warning to alert the operator in case of a missing melody or if the melodies are defined as resources not to be used. If there is a missing melody, then the resource compiler uses a default melody. The warning is shown when the resources are compiled or, alternatively, when the compiler stops. The standard GSM-defined melodies, the Dual-Tone-Multiple-Frequency (DTMF) tones and the key click of the mobile phone 1 are typically not defined via resources.

Menus

In many cases, there is more than one menu in the system. The resource compiler creates a downloadable table with a structure defining the parameters of the menu and a table containing the items. The parameters of the menu include, without limitation, choices x, y, w, and h, styles, a headline, a menu subclass, an allowed automatic exit, a does-not-quit-because-of-timeout option and a type of menu. The type of menu includes text based, bitmapped, animated and with or without a scrollbar. Each of the items contained in the table have associated parameters including a T-symbol of the item and a pointer. The pointer may be the number of an internal resource of the software, a terminal item, an activator for some functionality, or a pointer, such as a resource number to another menu for menu chaining. A pointer, such as a number of an internal resource, may also be a check mark and a flag for conditional activation.

The software does not need to publish any information about what menus must or should be present in the system, since the menu tree can be completely defined as a set of resources. However, the resource compiler has information on respective entry points of the menu(s). For every entry point of a menu, the resource compiler specifies a top menu of a menu tree wherein no menu is also an acceptable choice. The resource compiler detects circular references between menus and issues a warning alerting the operator if a menu is missing. The warning is shown in case of a missing menu when the resources are compiled.

Dialogues

During programming, the run-time software shows a list of the available dialogues in the system, with the information for the resource compiler to complete the look and feel during a later handling of the mobile phone 1. For the dialogues, there is a set of dialog engines. These dialog engines implement the behavior of the dialog, and use external resources to define the look and feel of the mobile phone 1. An implemented mechanism links a menu item to a dialog engine.

Each dialog engine includes the presence of some standard dialogues to handle text entry, number entry, on or off, and multiple choices. These standard dialogues are user-configurable via resources. A dialogue resource contains the identifier of a help text. The standard on-off dialog is configurable as menu-based, toggle-based, bitmapped with one bitmap for the "on" state and one for the "off" state, and animated with one animation for the "on" state and one for the "off" state.

The customizable portions in a dialog are the text of the dialog, the position of the text, the text of the softkeys, and the keyboard. This customization is available for all of the possible language groups. A dialog uses one or more melodies to indicate some relevant actions, for example, to indicate a selection made by the user. Normally, these melodies are all turned off by default. A selection dialog is available to turn on the melodies.

Fonts

The software of the external data source displays a list of fonts. The resource compiler creates a downloadable table with font name and font data specifying a format of fonts. The resource compiler avoids duplication of the fonts, such as, if two of the fonts are mapped to the same font resource, then the latter font is downloaded only once. Additionally, the resource compiler handles a compression algorithm, especially in case of Chinese fonts, and issues a warning to the operator if the specified font is missing or if the fonts are defined as resources not be used. If no fonts are downloaded, an error message is issued preferably in English in the main display 11 or at the external data source.

Keyboards

The software of the external data source issues a list of the keyboard components or keys. The resource compiler creates a downloadable table with a keyboard name, a meaning of each key, and a control functionality of each key, such as keydown, repeat and keyup events. For simple keys the sequence of characters is specified which is associated with a specific key. For international keys or keyboards, the resource compiler specifies using upper and lowercase letters and the sequence of characters for each key and for each language.

The resource compiler avoids duplication of keyboards and of event or characters list. For example, if the character list for an international key is the same in all the languages, this is stored in only one resource to be downloaded. The resource compiler issues a warning to the operator in case of a missing keyboard or in case of keyboards that are defined but not used. If no keyboards are downloaded, an error message typically hardcoded in a base window is issued preferably in English.

Technical Features of Tools for Programming and Downloading Internal Tools

General Features

In an advantageous embodiment, a resource language resembles or uses a Microsoft™ Windows™ resource language by Microsoft Corporation of Redmond, Wash. The resource language may include the necessary additions and modifications to support customer or manufacturer specific resources.

End User Tools

Mobile phone manufacturers during the development phase have full capability to customize all of the resources. A textual description is used and preferred for tracking reasons. A graphical user interface with respective drag and drop functionality is provided at the external data source. Alternatively, a command line based tool could be used to download an off-line developed resource file.

The end user tool is preferably run via the Web i.e., the Internet. Customization of the mobile phone 1 is performed over the air interface via a data call. Each end user tool might be composed of one big executable program or many different programs. In either case, the end user tool is logically composed of a Resource Editor, a Resource Compiler and a Resource Loader.

Resource Editor

The resource editor is a program within the external data source that allows for easy editing of the resources in a graphical way. Copy, paste, drag and drop functions are supported in a similar way as, for example, in Microsoft™ Windows™. The resource editor is logically composed of many different parts but seems to be only one application. The parts of the resource editor includes one for text labels, one for bitmaps and one for others. The following file formats, without limitation, are supported when importing files, i) Sound MIDI files (MID), ii) Wavefiles for sampled sounds (WAV), iii) graphic file formats such as bitmap files (BMP), Graphics Interchange Format (GIF) and animated GIF, PCX files (a graphics image file format developed by ZSOFT) and WAP-related file formats.

Resource Compiler

The resource compiler is adapted to compile an intermediate file. The output of the resource compiler is a binary file for further downloading. Encryption of the data is supported, since it is important to avoid access by unauthorized third parties to the compiler. The output is fed into the resource loader or saved into a file.

Resource Loader

The resource loader is similar to an internal tool, but is integrated in the menu of the resource editor giving the impression of being only one application. The resource loader is logically connected with the resource compiler or may be launched independently using a previously saved binary image of the resources. The decoding of the encrypted data is typically done inside the mobile phone 1, not within a PC-loader. The resource loader checks the brand of the mobile phone 1 and the version of the man machine interface software in it, refusing to download the resource if this information does not match the resource to be downloaded.

What is claimed is:

1. A mobile phone, comprising:
an interface unit configured to download, independent of activation of communication services of said mobile phone, user interface data from an external data source in a production environment after a manufacturing phase of said mobile phone, said user interface data configured to provide an interface for a user of said mobile phone;
a digital memory configured to store said user interface data and run-time software installed during said manufacturing phase, said run-time software configured to employ said user interface data to tailor said mobile phone for a specific market, wherein said user interface data is associated with numeric values in a downloadable table and said run-time software is configured to issue messages having symbols wherein each of said symbols is associated with a specific one of said numeric values to thereby identify said user interface data for said download.

2. The mobile phone as recited in claim 1 wherein fixed resources are stored in said digital memory during said manufacturing phase.

3. The mobile phone as recited in claim 1 wherein said user interface data is downloaded with executable software.

4. The mobile phone as recited in claim 1 wherein said interface unit includes a connector configured to establish an electrical connection for said download.

5. The mobile phone as recited in claim 1 wherein said production environment is a location selected from the group consisting of:
a mobile phone manufacturer,
a mobile phone wholesaler, and
a mobile phone vendor.

6. The mobile phone as recited in claim 1 further comprising a keyboard including at least a section wherein a layout thereof is defined by said downloaded user interface data.

7. The mobile phone as recited in claim 1 further comprising a main display including at least a section where dialogues or menus are displayed, said dialogues and said menus being provided by said downloaded user interface data.

8. The mobile phone as recited in claim 7 wherein said main display shows icons having associated functionality on a touch-screen area thereof wherein said icons and said associated functionality is provided by said downloaded user interface data.

9. The mobile phone as recited in claim 1 further comprising a loudspeaker and an electronic circuitry connected thereto for driving said loudspeaker, said downloaded user interface data comprising melodies, speech messages or acoustic signals associated with functions of said mobile phone.

10. The mobile phone as recited in claim 1 further comprising an infrared transceiver wherein said user interface data is downloaded via said infrared transceiver.

11. The mobile phone as recited in claim 1 wherein said downloaded user interface data defines a menu structure for functions of said mobile phone.

12. A system for configuring a mobile phone for a specific market, comprising:
   an external data source located in a mobile phone production environment; and
   an end user tool that facilitates a transfer of user interface data from said external data source to said mobile phone after a manufacturing phase and independent of activation of communication services of said mobile phone, said user interface data for tailoring said mobile phone for a specific market, wherein said end user tool includes a resource compiler configured to generate a downloadable table to transfer said user interface data, said downloadable table including said user interface data associated with numeric values, wherein said run-time software is configured to issue messages having symbols where each of said symbols is associated with a specific one of said numeric values to thereby identify said user interface data for said download, and said mobile phone includes an interface unit configured to download said user interface data; and a digital memory configured to store said user interface data and run-time software during said manufacturing phase, said run-time software configured to employ said user interface data for said tailoring.

13. The system for configuring a mobile phone as recited in claim 12 wherein said end user tool includes at least one tool selected from the group consisting of:
   a Resource Editor,
   a Resource Compiler and
   a Resource Loader.

14. The system for configuring a mobile phone as recited in claim 12 wherein said external source is configured to download data employing a layered approach.

15. The system for configuring a mobile phone as recited in claim 12 wherein said run-time software includes a Resource Loader that is configured to determine a compatibility of said downloaded user interface data and said run-time software.

16. A method of configuring a mobile phone for a specific market, comprising:
   connecting said mobile phone to an external data source in a mobile phone production environment after a manufacturing phase thereof; and
   downloading user interface data from said external data source to said mobile phone independent of activation of communication services of said mobile phone, wherein said user interface data is identified by run-time software of said mobile phone and employed by said run-time software to provide an interface for a user of said mobile phone in said specific market, wherein said user interface data is associated with numeric values in a downloadable table and said run-time software is configured to issue messages having symbols wherein each of said symbols is associated with a specific one of said numeric values to thereby identify said user interface data for said download.

17. The method as recited in claim 16 wherein said connecting is via an electrical connection.

18. The method as recited in claim 16 wherein said mobile phone production environment is at a mobile phone manufacturer.

19. The method as recited in claim 16 wherein said mobile phone production environment is at a mobile phone wholesaler.

20. The method as recited in claim 16 wherein said mobile phone production environment is at a mobile phone vendor.

21. The method as recited in claim 16 further comprising generating a downloadable table in the external data source where said user interface corresponds to numeric values associated with symbols in messages issued by said run-time software, where said downloading includes downloading said table.

22. The method as recited in claim 16 wherein said downloading of said user interface data occurs before activation of said mobile phone is complete.

* * * * *